May 23, 1961   M. DREYFUS   2,985,814
VOLTAGE- AND CURRENT-REGULATING SYSTEMS OF DYNAMOS
Filed April 2, 1957   5 Sheets-Sheet 1

INVENTOR
MARCEL DREYFUS
By Kenyon & Kenyon
ATTORNEYS

May 23, 1961

M. DREYFUS 2,985,814

VOLTAGE- AND CURRENT-REGULATING SYSTEMS OF DYNAMOS

Filed April 2, 1957

INVENTOR
MARCEL DREYFUS
BY Kenyon & Kenyon
ATTORNEYS

INVENTOR
MARCEL DREYFUS
By Kenyon & Kenyon
ATTORNEYS

United States Patent Office 2,985,814
Patented May 23, 1961

2,985,814
VOLTAGE- AND CURRENT-REGULATING SYSTEMS OF DYNAMOS
Marcel Dreyfus, Rueil-Malmaison, France, assignor to Société Anonyme dite: Etablissements Ducellier, Paris, France
Filed Apr. 2, 1957, Ser. No. 650,218
Claims priority, application France Apr. 4, 1956
5 Claims. (Cl. 322—28)

The present invention relates to systems for regulating the voltage and current of electric generators.

Present day apparatus for regulating the current of dynamos act as a rule on the energizing or field current of these machines by inserting a variable resistance in series with the field windings.

The variation of this resistance is obtained automatically by means of an electromagnet adapted either to separate during a variable time period a pair of contacts short-circuiting a fixed resistance, or to allow a carbon-disk stacking to expand, or to alter the pressure exerted by an electrode on a semi-conducting disk.

In known arrangements the force producing any one of these actions results from the difference between the attraction $f$ of the electromagnet and the mechanical resistance F of a spring acting in the reverse direction.

The electromagnet winding provides a number of ampere-turns which is proportional to the voltage to be controlled.

Therefore, a regulator is a relay acting either directly or as a pilot-relay for varying a resistance in series with the field winding of the dynamo.

Although the number of ampere-turns provided by the electromagnet winding does not vary with time when the voltage applied thereto remains constant, the same does not apply to physical component elements, to the metal assemblies constituting the magnetic circuit, or to the mechanical resistance F subordinate to the modulus of elasticity of the spring.

Consequently, the adjustment values are so altered that these regulators are unable to maintain in the time the conditions required for constantly providing the desired voltage.

It is the essential object of the present invention to provide a device whereby a voltage regulator of the aforesaid type is constantly adapted to ensure such adjustment conditions as required to exactly meet the momentary operating conditions.

This result is obtained, according to the present invention, by inserting in the adjustment circuit a reference voltage selected according to the value to be adjusted, this reference voltage acting through the medium of a transistor to operate the regulator only if a difference, even of very small value, occurs in one or the other direction between this reference voltage and the voltage to be controlled.

As the physical structure of the regulator proper does not interfere and as the value of the reference voltage is such as to constantly remain bound to the value of the voltage to be controlled, it will be readily understood that the conditions of operation of the device are constantly met.

According to a particularly advantageous form of embodiment of this invention a single and same regulator is employed for adjusting both the voltage and the current of the generator.

To this end, the dynamo regulator is subordinate to either a pair of transistors of which the one is operative when a difference occurs between the reference voltage and the load voltage, and the other is adapted to convert the current variation of the load circuit into a voltage variation by inserting a shunt in said circuit, or a single transistor in combination with the insertion of a series winding compound with the shunt winding of the regulator.

According to another possible embodiment of the present invention the electronic regulator is applied to the parallel coupling of generators.

According to an alternate embodiment the device is so modified as to increase its stability of operation irrespective or as a function of temperature variations.

Finally, it is a further alternate embodiment of this invention to provide a regulator comprising a transistor as a substitute for the conventional regulator proper.

Several forms of embodiment of the present invention will now be described by way of example with reference to the attached drawings wherein:

Figure 2 is a modified embodiment comprising two transistors.

Figure 1:
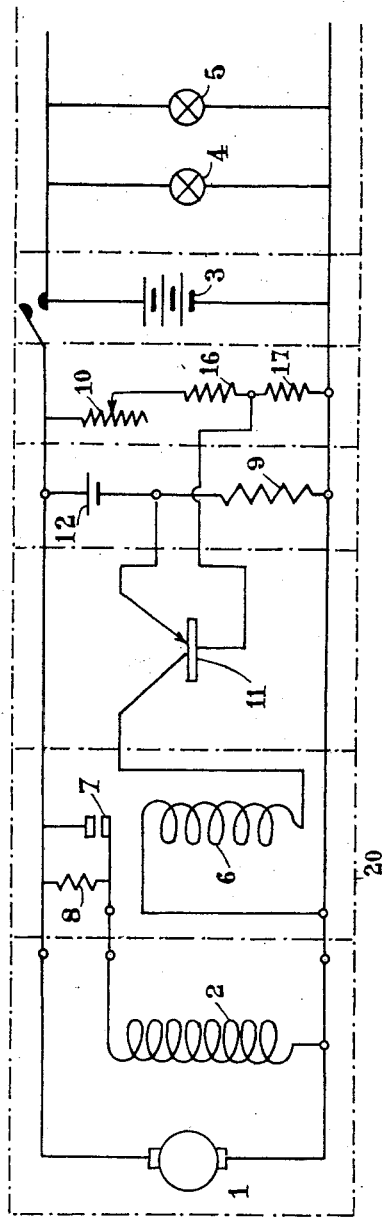
Figure 1 illustrates a first embodiment of a voltage regulator according to this invention.

Referring first to Fig. 1, the dynamo 1 having an energizing circuit 2 is adapted to charge the battery 3 connected to the load apparatus 4 and 5; a conventional-type regulator (Fig. 1) comprises an electromagnet 6 adapted, when the voltage to be controlled exceeds a predetermined value, to separate the contacts 7 by inserting in the induction circuit 2 the complementary resistance 8.

The device according to this invention controls the operation of the electromagnet of a conventional-type regulator in one or the other direction according as the dynamo voltage or a voltage proportional thereto is higher or lower than a reference voltage which may be fixed or variable according to the momentary conditions.

This reference voltage may be but one fraction of the voltage applied to the dynamo terminals; it may be obtained or derived in any suitable manner known per se; a mounting adapted to supply this voltage is shown diagrammatically in the form of a low-capacity storage battery 12 and by the resistance 9, a rheostat 10 and resistances 16—17 providing a voltage proportional to the battery voltage at the junction between resistances 16 and 17; both voltages are fed to the transistor 11 which, according as the voltage proportional to the battery voltage is lower or higher than the reference voltage, either maintains the regulator 6, 7, 8 in its inoperative condition by leaving the contacts 7 closed, or operates this regulator to open the contacts 7 and insert the resistance 8 in the energizing field circuit 2 of the dynamo 1.

In a modified embodiment (Figure 2) comprising a dynamo 1, the regulating device according to the invention comprises a source 12 of reference voltage and a transistor 11 operative to supply current to the winding 6 of regulator 20 when the base voltage of the transistor 11 which is proportional to the battery voltage, is lower than the emitter voltage. Another transistor 19 is provided, wherein the emitter base circuit is fed by the voltage drop occurring in a shunt 18 inserted in the line 21 of the load circuit 4 and the collector is connected to the winding 6 of regulator 20. If desired, the thick wire of the cutout relay (not shown) may be substituted for this shunt 18.

When a predetermined current value flows through the shunt 18 the corresponding voltage drop taking place in this shunt is adapted to cause current to flow also through the transistor 19.

The winding 6 of regulator 20 is then energized and the voltage measured across the terminals of dynamo 1 is of such value that the current flowing through this dynamo is constant.

Figure 3:
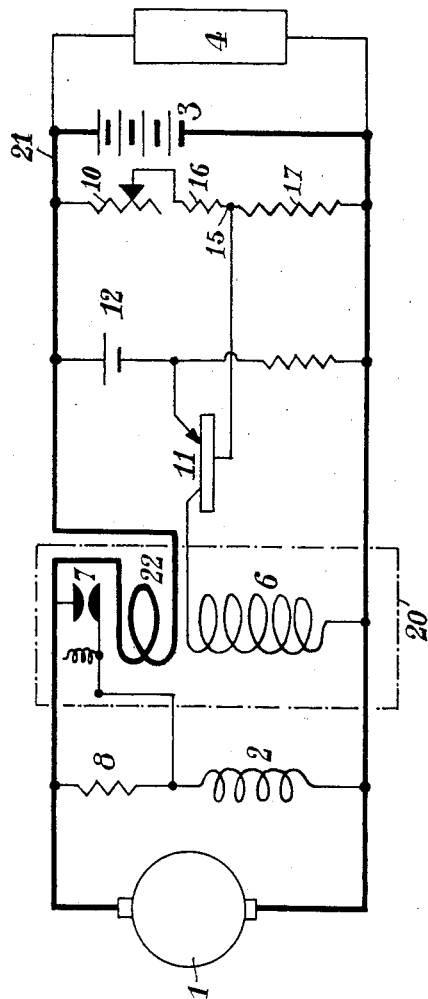
Figure 3 shows an arrangement comprising a single transistor in the case of a voltage- and current-regulator.

In another modified embodiment shown in Fig. 3 of the drawings the voltage adjustment takes place as in the preceding cases described hereinabove. The no-load operation of the regulating device is unchanged.

When a load is applied to the output of dynamo 1, current flows through the series winding 22 concentric with the shunt winding of the regulator so that the ampere-turns of both windings are compound.

Let us assume that $N_1 i_1$ denotes the ampere-turns of the series turns 22, and that $N_2 i_2$ denotes the ampere-turns of the shunt turns 6. The regulator 20 becomes operative for a total ampere-turn figure $$NI = N_1 i_1 + N_2 i_2$$

Consequently, when the current value $i_1$ of the generator output increases the current value $i_2$ in the winding 6 which is necessary to release the regulator 20 decreases. Thus, to each value of the charge current $i_1$ there correspond a predetermined value of the voltage difference emitter-base at which the regulator 20 is released. When $i_1$ attains a value such that $N_1 i_1 = NI$, that is, when the emitter-collector current is $i_2$ is zero, the ampere-turns of the shunt winding become negligible and the series winding alone is operative to provide a current regulation.

Figure 4:
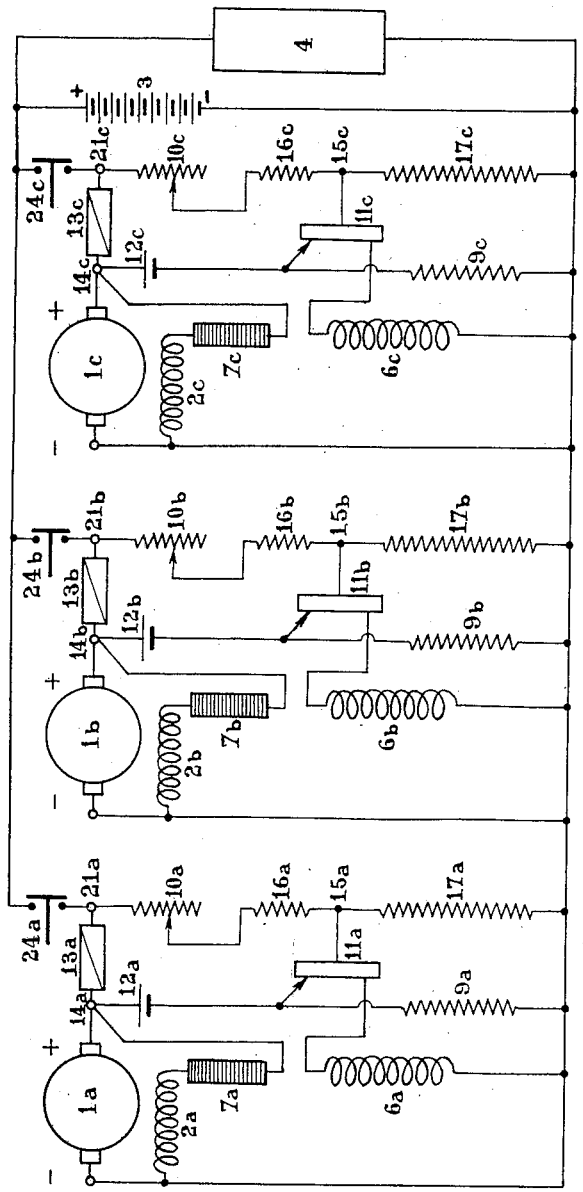
Figure 4 is a wiring diagram showing the parallel coupling of a plurality of dynamos each associated with a regulator according to the invention.

In Fig. 4, the dynamos 1a, 1b, 1c are connected in parallel and controlled through cutout relays 24a, 24b, 24c respectively which connect these dynamos to a battery 3 and a load circuit 4. Balancing shunts 13a, 13b, 13c are inserted in the dynamo circuits, each of these dynamo circuits also comprising a regulator of known construction, which—in the case considered herein—is selected as a carbon-disk stacking regulator having the same function as the assembly comprising the contact 7 and resistor 8 of a vibrating regulator provided in the arrangement shown in Fig. 1. Again, the emitter of a PNP-type transistor 11 in the example illustrated is connected to the negative terminal of a source of reference voltage 12a. The collector of this transistor is connected in the same way to the coil 6a whereas its base is connected to a predetermined point 15a of a voltage divider comprising the resistances 16a and 17a and furthermore the potentiometer 10a connected in series thereto.

The increase in a dynamo output, for example the dynamo 1a, will produce a voltage drop in the corresponding shunt 13a, thus tending to modify the voltage between points 14a and 15a.

As the emitter-collector current of transistor 11a is invariable the voltage between the emitter and base of this transistor cannot change.

Consequently, if the voltage across the terminals of shunt 13a tends to rise above the normal operating value, as the voltage between the emitter and the base of the transistor or between 14a and 15a is constant, the voltage between 21a and 15a must decrease. As this voltage difference between 21a and 15a is proportional to the adjustment voltage, the latter will compulsorily decrease.

Thus, it is apparent that if the output of a dynamo were applied to another dynamo while reversing the circulation currents in the shunts, the voltage of the dynamo having the lowest output would be increased, and the voltage of the dynamo having the highest output would be decreased.

Figure 5:
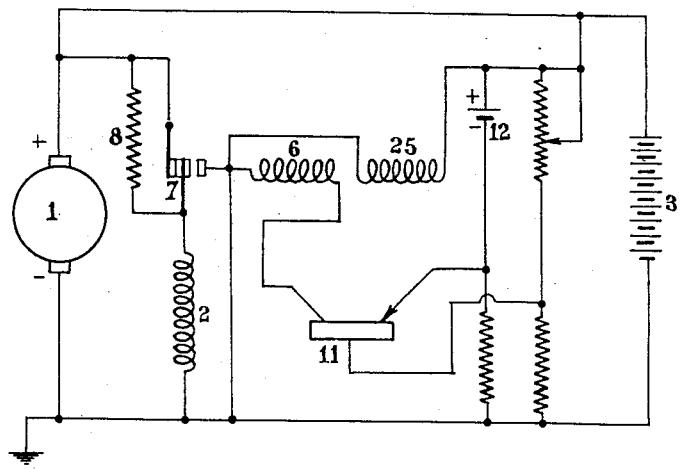
Figure 5 is another wiring diagram showing a regulator of which the operation is stabilized with respect to temperature variations.

In Fig. 5, there is illustrated the wiring diagram of a regulating system of which the operation is stabilized with respect to temperature variations.

The heating of a transistor occasionates a reduction in its adjustment voltage due to the specific character of its operating curve.

The copper winding 25 connected across the terminals of the dynamo 1 is compound-wound with the other winding 6 controlled through the transistor 11.

The heating of the coil 25 increases the adjustment voltage by reducing the ampere-turns.

Therefore, by properly selecting the coils 25 and 6 it is possible to compensate the transistor 11 as a function of the heating produced in the complete regulating system.

Figure 6:
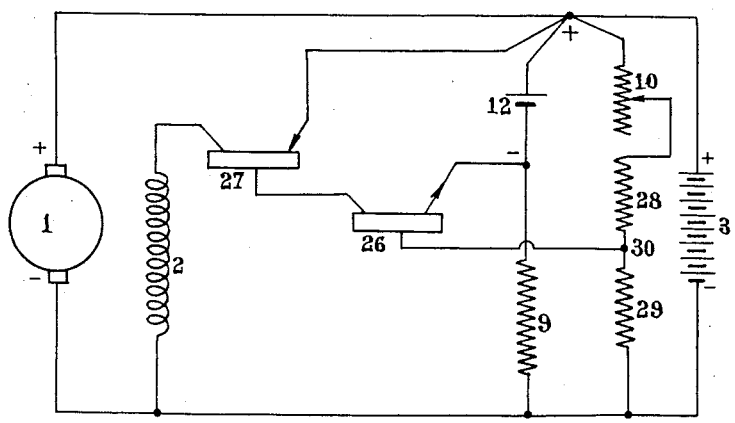
Figure 6 is another wiring diagram showing a regulating arrangement wherein a transistor is used as a substitute for the conventional regulator.

In Fig. 6 there is shown the wiring diagram of a modified embodiment of a regulator according to this invention. In this alternate embodiment the regulator illustrated in Fig. 1 as consisting of an assembly 6, 7, 8 is replaced by a PNP-type transistor 27. The collector of this transistor is connected to the field winding 2 and its emitter is connected to the positive terminal of the dynamo 1, while its base electrode is connected to the collector of the regulating transistor 26. This transistor 26 is of the NPN-type and has its emitter connected to the negative terminal of the source of reference voltage 12 and its base electrode connected to a junction point 30 between the resistors 28 and 29. When the voltage at the output terminals of the dynamo is low, the voltage at the junction point 30, that is of the base electrode of transistor 26, is more positive than the potential of the emitter of said transistor. Therefore the NPN-type transistor 26 is conducting and consequently the base electrode of the PNP-type transistor 27 connected to the collector of transistor 26 is substantially at the negative potential of the terminal corresponding to he source of reference voltage 12. Since the emitter of the PNP-type transistor 27 is connected to the positive terminal of this source 12 of reference voltage, the transistor 27 is also conducting. As a consequence, the practically negligible resistance of the emitter-collector path is inserted in the circuit of the field winding 2.

When the voltage across the terminals of the dynamo increases the voltage difference between the base electrode of the emitter of transistor 26 (which was initially positive) decreases and attains zero value at a predetermined value of the voltage across the dynamo terminals. At this time the transistor 26 is blocked and the other transistor 27 also passes through its blocked condition, in that it actually has a low collector current. The flux induced in the field coil 2 will thus decrease and as a result a corresponding voltage drop will occur at the dynamo terminals. The voltage of this dynamo will therefore constantly tend to assure a limit-value which it will never exceed. This value is the adjustment voltage of the dynamo and is adjustable by means of the rheostat 10.

What I claim is:

1. A device for adjusting the output voltage of a generator utilized for feeding a load circuit, which comprises a generator excitation winding, a variable resistance element mounted in series with said winding, means for modifying the value of said variable resistance element, a first transistor comprising first and second control electrodes and an output electrode, means for generating a voltage proportional to the voltage across the terminals of said generator, means for feeding said voltage to said first control electrode of said first transistor, other means for creating a reference voltage, means for feeding said reference voltage to said second control electrode of said first transistor, the output electrode of said first transistor being connected to said means for modifying the value of said variable resistance element in series with said excitation winding to decrease the resistance of said variable resistance element and consequently reduce the voltage across the generator terminals when the absolute value of the voltage fed to said first control electrode becomes higher than the voltage fed to said second control electrode of said first transistor, a shunt inserted in series in the load circuit of the generator, a second transistor comprising two control electrodes and an output electrode, said two control electrodes of said second transistor being connected to the terminals of said shunt and said output electrode being connected to said means for modifying the value of the variable resistance element in series with the excitation winding, whereby said second transistor will become conductive and may control said last-named means when the current fed by said generator in said shunt attains a predetermined value.

2. A device for adjusting the output voltage of a generator utilized for feeding a load circuit, which comprises a generator excitation winding, a variable resistance element mounted in series with said winding, means for modifying the value of said variable resistance element, a first PNP-type junction transistor comprising an emitter electrode, a base electrode and a collector, a voltage divider connected across the two terminals of said generator, one point of said voltage divider being connected to the base electrode of said transistor, a reference-voltage element comprising a positive terminal and a negative terminal connected in parallel to the generator terminals, a connection between said positive terminal of said reference-voltage element and the positive terminal of the generator, another connection between the negative terminal of said reference-voltage element and the emitter of said first transistor, a connection between said collector and said means for modifying said variable resistance element in series with the excitation winding, said last-mentioned connection being adapted to cause a control current to flow through said last-named means when the voltage fed to the emitter of said transistor exceeds the voltage fed to the base electrode of said transistor, a shunt inserted in series in the load circuit of said generator between the point where the positive terminal of said reference-voltage element and the point where one terminal of said voltage divider are interconnected, a second transistor comprising two control electrodes and an output electrode, said two control electrodes of said second transistor being connected to the terminals of said shunt and said output electrode being connected to said means for modifying the value of the variable resistance element in series with the excitation winding, whereby said second transistor will become conductive and may control said last-named means when the current fed by said generator in said shunt attains a predetermined value.

3. A device for adjusting the output voltage of a generator utilized for feeding a load circuit connected to the generator terminals, which comprises a generator excitation winding, a resistor in series with said excitation winding, a contact normally short-circuiting said resistor, an electromagnet having a shunt winding and controlling said contact, a switch transistor comprising a first and a second control electrode and an output electrode, means for generating a voltage proportional to the voltage across the terminals of said generator, means for feeding said voltage to said first control electrode of said transistor, other means for creating a reference voltage, means for feeding said reference voltage to said second control electrode of said switch transistor, the output electrode of said transistor being connected to said shunt winding of the electromagnet whereby, when the voltage across the generator terminals rises above a predetermined value, the normally non-conductive transistor is switched on and a current is flowing through the shunt winding in order to open said contact and thus reduce the field current of the generator.

4. A device for adjusting the output voltage of a generator utilized for feeding a load circuit connected to the generator terminals, which comprises a generator excitation winding, a resistor in series with said excitation winding, a contact normally short-circuiting said resistor, an electromagnet having a shunt winding and controlling said contact, a PNP-type junction transistor comprising an emitter, a base electrode and a collector, means for generating a voltage proportional to the voltage across the terminal of said generator, means for feeding voltage to the base of said transistor, a reference-voltage element comprising a positive terminal and a negative terminal connected in parallel to the generator terminals, a connection between said positive terminal of said reference-voltage element and the positive terminal of the generator, another connection between the negative terminal of said reference-voltage element and the emitter of said transistor, a connection between said collector and the shunt winding of the electromagnet whereby, when the voltage across the generator terminals rises above a predetermined value, the normally non-conductive transistor is switched on and a current may flow through the shunt winding in order to open said contact and thus reduce the field current of the generator.

5. A voltage regulator as set forth in claim 4, which comprises another winding compound wound on the core of said electromagnet, said other winding being connected to the terminals of said generator to compensate any variations in the adjustment voltage which may result from variations of the characteristics of the transistor due to the temperature of the regulator.

References Cited in the file of this patent

UNITED STATES PATENTS

| | | |
|---|---|---|
| 1,344,689 | Haas | June 29, 1920 |
| 1,440,879 | Lee et al. | Jan. 2, 1923 |
| 1,911,074 | Gerald | May 23, 1933 |
| 1,917,473 | Ohlsen et al. | July 11, 1933 |
| 1,936,787 | Gork | Nov. 28, 1933 |
| 2,030,107 | Gulliksen | Feb. 11, 1936 |
| 2,244,307 | Menzel | June 3, 1941 |
| 2,607,026 | Lacien | Aug. 12, 1952 |
| 2,611,121 | Emerson | Sept. 16, 1952 |
| 2,629,855 | Schmitt | Feb. 24, 1953 |
| 2,693,568 | Chase | Nov. 2, 1954 |
| 2,751,545 | Chase | June 19, 1956 |
| 2,769,134 | Hookham | Oct. 30, 1956 |
| 2,809,301 | Short | Oct. 8, 1957 |
| 2,862,175 | Guyton et al. | Nov. 25, 1958 |
| 2,883,609 | Amblard | Apr. 21, 1959 |